United States Patent [19]

Farrar et al.

[11] Patent Number: 5,171,781

[45] Date of Patent: Dec. 15, 1992

[54] POLYMERIC COMPOSITIONS

[75] Inventors: David Farrar; John R. Field; Peter Flesher, all of West Yorkshire, Great Britain

[73] Assignee: Allied Colloids Limited, England

[21] Appl. No.: 303,476

[22] Filed: Jan. 27, 1989

Related U.S. Application Data

[63] Continuation-in-part of Ser. No. 150,357, Jan. 29, 1988, abandoned, and a continuation-in-part of Ser. No. 150,277, Jan. 29, 1988, abandoned.

[30] Foreign Application Priority Data

| | | |
|---|---|---|
| Jan. 30, 1987 [GB] | United Kingdom | 8702052 |
| Jul. 20, 1987 [GB] | United Kingdom | 8717093 |
| Aug. 13, 1987 [GB] | United Kingdom | 8719215 |
| Aug. 13, 1987 [GB] | United Kingdom | 8719216 |
| Jan. 28, 1988 [GB] | United Kingdom | 8801902 |
| Jan. 28, 1988 [GB] | United Kingdom | 8801903 |
| Dec. 30, 1988 [GB] | United Kingdom | 8830384 |

[51] Int. Cl.⁵ ............................................. C08L 41/00
[52] U.S. Cl. .................................... 524/547; 524/555; 524/556; 526/287; 526/288; 526/303.1; 526/310; 526/317.1
[58] Field of Search ............. 524/555, 547, 556; 526/317.1, 287, 288, 303.1, 310

[56] References Cited

U.S. PATENT DOCUMENTS

| | | | |
|---|---|---|---|
| 3,991,005 | 11/1976 | Wallace | 523/129 |
| 4,059,552 | 11/1977 | Zweigle et al. | 526/81 X |
| 4,696,762 | 9/1987 | Sander et al. | 252/311 |
| 4,720,346 | 1/1988 | Flesher et al. | 523/322 X |

FOREIGN PATENT DOCUMENTS

| | | | |
|---|---|---|---|
| 0045297 | 2/1982 | European Pat. Off. | 523/129 |
| 0277018 | 1/1988 | European Pat. Off. | |
| 0318989 | 12/1988 | European Pat. Off. | |

Primary Examiner—Joseph L. Schofer
Assistant Examiner—J. M. Reddick
Attorney, Agent, or Firm—Ostrolenk, Faber, Gerb & Soffen

[57] ABSTRACT

Water absorbent particulate polymers and their uses are described. Friable aggregates may be made by bonding substantially dry polymer particles with an aqueous liquid and drying the aggregates. These aggregates can be broken down to the individual polymer particles upon mixing with an aqueous medium and thus can have the flow properties of relatively coarse particles and the performance properties of relatively fine particles. They may be soluble nd used as flocculants or viscosifiers or binders for, for instance, iron ore pelletisation. Alternatively they may be swellable and insoluble, for instance for converting a sticky particulate mass (such as coal fines filter cake) to a crumbly solid. When pellets are formed by compression moulding from a crumbly solid made by mixing water absorbent polymer particles with a sticky mass of inorganic particles (such as a coal fines filter cake) improved properties are obtained when the absorbent polymer particles are introduced in the form of a dispersion in water-immiscible liquid.

12 Claims, No Drawings

POLYMERIC COMPOSITIONS

This is a continuation-in-part of applications Ser. No. 150,277 and 150,357, both filed on Jan. 29, 1988, both abandoned.

This invention relates to water absorbent polymers, and uses of them. Some of the subject matter defined herein is described also in GB 2,200,133A and GB 2,200,440 but the common subject matter has the same priority date of Jan. 28, 1988. This subject matter is also described in other counterparts of the two British patent publications, but these counterparts have the same or later priority date for the relevant subject matter.

Water absorbent polymers can absorb large amounts of deionised water, e.g., at least 25 grams deionised water per gram dry weight of polymer. The polymers can be insoluble in water, in which event particles of the polymer will swell and absorb water but will not dissolve into the water, or the polymers can be soluble in water, in which event particles of the polymers will initially swell to absorb water but will subsequently dissolve into the water.

Water absorbent synthetic polymers can be made by, for instance, graft polymerisation, but the polymers are normally made in particulate form on a commercial scale by reverse phase bead polymerisation followed by drying or by gel polymerisation followed by drying and comminution.

The product of reverse phase bead polymerisation usually has relatively good flow properties but may contain significant amounts of undersized particles and these can cause difficulties during handling, for instance due to dusting problems or flow problems in some instances, and can cause difficulties during absorption of water.

The product of gel polymerisation and comminution tends to have a wide range of particle sizes. The particles generally are randomly shaped and are not substantially spherical, and so flow problems can arise when there is a substantial proportion of smaller particles, for instance below 125 or 150 $\mu$m. Also there can be a significant amount of undersized particles in the product and these can cause dusting problems during handling and absorption problems upon contact with water.

In general, it is desirable for the particles to be substantially all above 125 $\mu$m (in order to minimise flow problems) and it is particularly desirable that the product should be substantially free of particles below 50 $\mu$m, in order to minimise dusting problems during handling and absorption problems upon contact with water. For instance if there are significant amounts of very small particles then these very small particles may collect together into sticky lumps upon contact with water, and will then only absorb water very slowly.

Where any of these problems are particularly serious, it is therefore common to sieve the undersized particles from the product. The removed fines are then dumped, used in an environment where dusting, flow or absorption properties are adequate, or recycled so as to form part of the final dried product. For instance they can be put back into the gel recovery process at a wet stage and will then form a component of particles of the final product and which it is intended should be coarser. Such recycled undersized particles will form a minor proportion only of the final product and will be present as permanent components of coarser particles in the final product.

None of these techniques are entirely satisfactory and so it would be desirable to be able to reduce the production of fines or to be able to use them in some beneficial manner.

In theory, very small polymer particles will absorb water more quickly than larger particles but in practice this may not happen. For instance when the relatively coarse particles used in the process of EP 195550 are replaced by the same weight of finer dry powder it is found that the absorption appears less effective. Also it is necessary to prevent the small particles from lumping together during the absorption or hydration of the particles.

It is known to make reverse phase dispersions of cross linked polymers, for instance as thickeners for aqueous media, and reverse phase dispersions of water soluble polymers, for instance as flocculants for aqueous media, wherein the size of the polymer particles is typically below 3 $\mu$m. Recovery of the product in corresponding powder form tends to incur unacceptable dusting and flow problems.

It is known to make cross linked water absorbent polymers by precipitation polymerisation, and it appears that the precipitate that is collected consists of clusters (perhaps of a size 5-25 $\mu$m) of smaller particles, perhaps having a size of 1 $\mu$m or less. These clusters readily break down during handling to form a rather dusty powder. It seems that when the precipitated clusters are dispersed into water, as a thickening agent, the individual cross linked particles separate from one another. However this is not relevant to the significant commercial problem of utilising the large volumes of fines of gel polymer that are made by reverse phase bead polymerisation or by comminuting polymer gel.

In the first aspect of the invention, a particulate polymeric product comprises particles of a water absorbent synthetic polymer, and in this product the polymer particles are mainly present in the form of friable aggregates that have been made by bonding substantially dry polymer particles with an aqueous liquid and drying the aggregates and that can be broken down substantially to the individual polymer particles by mixing the aggregates with an aqueous medium. In use, the aggregates behave initially (e.g., during handling) as coarse particles but subsequently (e.g., in an aqueous medium) as fine particles.

This aspect of the invention has two great advantages. First, it solves the problem of utilising fines or other undersized particles (that have previously been regarded primarily as a waste product) in such a manner that the performance properties of the polymers can be attained whilst avoiding the flow, dusting or other problems previously associated with the undersized particles. Secondly, it utilises them in a way that can result in beneficial performance properties compared to those that are obtained when the same polymer is introduced in coarser particulate form. In particular, it is possible to make aggregates that have the handling and dusting and initial water-absorption properties that would be associated with coarser particles of the polymer but which have performance properties that are better than would be expected for polymer particles of the same size as the aggregates but of conventional, non-friable, texture. It seems that when the aggregates break down within the aqueous medium the individual particles of the aggregates are then liberated and act within the medium as if they were individual particles. Thus benefit is obtained from the higher rates of absorption due to the small particle size within the aggregates but the flow and dusting properties of the aggregates, before addition to the aqueous medium, are dictated primarily by the particle size of the aggregates.

The particles of polymer are, in the products of the invention, mainly in the form of friable aggregates (i.e., at least 50% by weight of the polymer in the product is in the form of friable aggregates). This therefore contrasts with the minor proportion of fines that might be incorporated if fines are sieved from a dried product and recycled to a wet stage, as opposed to being dumped. It is possible for the product of the invention to include a deliberate addition of particles that are not in the form of the friable aggregates but generally substantially all the water absorbent polymer is introduced in the form of the friable aggregates. If the aggregates are rather weak and/or are subjected to rigorous handling conditions some breakage of the aggregates back towards the individual particles may occur during handling and storage but preferably at least 75%, and most preferably at least 90%, by weight of the particles are present as aggregates.

This aspect of the invention is of particular value when the polymer was formed initially as a polymer gel, i.e., as a concentrated solution in water. Preferably the polymer is synthetic and preferably it will have been made by bulk gel polymerisation or by reverse phase polymerisation. Preferably the particles will have been made by deliberate comminution of the bulk gel or beads made by reverse phase bead polymerisation or will be fines or other particles that are separated from the beads during drying. The comminution can be conducted such that most or all of the gel is converted to the desired fines or the desired particles can merely be a fraction that is sieved from coarser particles. Alternatively, the particles can be made by reverse phase emulsion or suspension polymerisation to give a particle size below 10 $\mu$m, often below 3 $\mu$m, followed by drying and separation of the particles from the continuous phase in known manner.

The aggregates are preferably of a size such that they can be handled by conventional particle handling apparatus and so normally the particle size is above 50 $\mu$m and below 2 mm although in some instances it can be larger, for instance up to 5 mm or even 10 mm maximum size. Usually the size of the aggregates is 90% (and preferably 95%) by weight at least 125 $\mu$m and more usually at least 200 $\mu$m, and preferably at least 500 $\mu$m, and often at least 700 $\mu$m. Thus the aggregates can be made to a size such that they have optimum flow properties and substantially no dusting or other absorption problems.

The particles within each aggregate will always be much smaller than the aggregate size since generally each aggregate contains at least 5 or 10, usually at least 50 and often at least 100 of the particles. The particles can have whatever size is optimum for their eventual performance and so if their optimum size (from the point of view of absorption and performance) is, say, 250 $\mu$m then the particles can have this size. Generally however the particles are of a size such that flow properties would be a problem (e.g., below 125 or 150 $\mu$m if the particles are made by comminuting gel) and/or such that dusting or absorption properties would be a problem, e.g., below 50 $\mu$m. The particles often have a size below 30 $\mu$m and often below 20 $\mu$m. They may be above 10 $\mu$m but can be smaller, e.g., 5 $\mu$m, 1 $\mu$m or less.

The aggregates are made by bonding substantially dry polymer particles by wetting them with an aqueous liquid that serves as a bonding agent for the particles by rendering their surfaces sufficiently sticky to form a sticky mass and then aggregating the particles while they are sticky. Thus the particles can be aggregated by swelling with sufficient water to form a comminutable gel followed by comminution to a coarse size and drying, to provide internally bonded aggregates.

Preferably the aggregates have a porous texture and so should not be compressed significantly while sticky. Preferably no deliberate compression step is applied while they are sticky. For instance the particles may be wetted with the aqueous liquid while entrained in air or tumbled along a surface to form aggregates which are dried while entrained in air or while being tumbled and may, if necessary, be comminuted to aggregates of the desired size. Suitable apparatus of this type is a fluid bed blender and agglomerator.

In another method, the polymer particles are stirred with the aqueous liquid to form an adhesive mass and this is then comminuted, for instance by extrusion through a screen. The comminution steps can be conducted while the mix is moist but often it is best to dry the mass and then comminute any oversize pieces in the mass, e.g., by attrition or sieving.

The fact that the particles have been aggregated using water can be seen easily by microscopic examination. The use of the water causes adjacent particles to merge into each other and tends to remove the sharp contours that comminuted fines normally have.

The aqueous liquid can be any aqueous liquid that will promote bonding of the particles to form friable aggregates. If the particles become adhesive upon contact with water then it is sufficient for the aqueous liquid to be water without any additional bonding agent in it. Often the water is used by itself but it can be desirable for the liquid to be an emulsion of water in a water immiscible liquid, such as kerosene, or to be an aqueous solution in a polar solvent such as aqueous methanol, ethanol, isopropanol or acetone.

In some instances it is desirable to include an aggregate binder in the aqueous liquid so as to impart additional strength to the aggregates. The aggregate binder may be a substantially non-ionic polymer, for instance polyvinyl alcohol, or it may be an ionic polymer. If it is ionic, it is generally preferable for it to be co-ionic with any ionic charge in the polymer particles. For instance if the polymer particles are anionic then the aggregate binder is preferably also anionic (for instance sodium polyacrylate or other water soluble anionic polymer of low molecular weight, typically below 50,000 and often below 10,000) whilst if the polymer particles are cationic then the aggregate binder is preferably a water soluble cationic polymer such as a polyamine or other relatively low molecular weight cationic polymer such as a dimethylaminoethyl methacrylate quaternary salt. In general, anionic and cationic aggregate binders can be formed from the same monomers as are discussed below for anionic or cationic polymer particles. Naturally occurring polymers, such as starches or cellulosic polymers, may be used as part or all of the aggregate binder.

The degree of bonding of the particles within the aggregate must be selected such that the aggregates have the desired degree of friability. If the degree of bonding is too high then the aggregates will withstand rough handling but may not break down upon mixing with the eventual aqueous medium. For instance if too much aggregate binder is added, or if water is being used and too much water is applied, the aggregates may become too firmly bonded and hard. If too little is used, the aggregates may break down too easily. Generally the amount of water is at least 10%, usually at least 30% on dry weight of polymer, but is generally below 120% and often below 80%. If a polymeric aggregate binder is included in the aqueous liquid then the amount is generally below 10% and often below 1% on the dry weight of polymer.

The particulate polymer that is in the form of aggregates can be a natural or modified natural polymer such as a starch or cellulose, for instance carboxy methyl cellulose polymer, but is preferably a synthetic polymer, preferably formed from a water soluble ethylenically unsaturated monomer or monomer blend. Generally it is an ionic synthetic polymer formed from anionic or cationic monomer, optionally with a non-ionic monomer. It may be amphoteric, being formed from a mixture of cationic and anionic monomers, optionally with non-ionic monomer.

Suitable anionic monomers are ethylenically unsaturated carboxylic acids or sulphonic acids, often in the form of a water soluble ammonium or, preferably, alkali metal salt. Suitable carboxylic acids are methacrylic, itaconic, maleic or, preferably, acrylic acid. Suitable sulphonic acids include allyl, methallyl, vinyl and 2-acrylamido-2-methyl propane sulphonic acids, often as ammonium, or more usually, alkali metal salt.

Suitable cationic monomers include dialkylaminoalkyl (meth) -acrylamides and -acrylates, usually as acid addition or quaternary ammonium salts, and monomers such as diallyl dimethyl ammonium chloride.

Suitable non-ionic monomers include (meth) acrylic esters, methacrylamide and, preferably, acrylamide.

The polymer in the polymeric product is normally unreactive but can include groups that will cause cross linking or the polymer can be reacted during or after the formation of the aggregates, for instance by reaction of acrylamide groups with glyoxal or formaldehyde.

It is particularly preferred to provide the aggregates or the particles within them with a surface layer that is more highly cross linked than the remainder of the particles in order to promote the rate of hydration of the individual particles and/or the rate of disruption of the aggregates. Ways of providing surface cross linking on soluble or swellable polymer particles are well known and comprise exposing the pre-formed particles to a suitable cross linking agent. For instance the aggregates may be exposed to a suitable cross linking agent after their formation or, preferably, the cross linking agent is included in the aqueous medium used for forming the aggregates. When the polymer is anionic a suitable cross linking agent is a polyvalent metal compound, for instance an aluminium compound. Other cross linking agents include epoxy compounds and counter-ionic polymers, generally having a low (e.g., below 100,000) molecular weight.

The polymer can include a mixture of water soluble cationic and water soluble anionic polymers in dry form since the mixture will be stable when dry but will react to insolubilise the polymer when wet. Thus aggregates of anionic polymer may be mixed dry with aggregates of cationic polymer.

The polymer is preferably formed from water soluble ethylenically unsaturated monomer or monomer blend of which at least 5%, and often at least 10%, by weight is ionic.

The polymer may be cross linked such that it is a water swellable and water absorbing, but water insoluble, synthetic polymer formed from water soluble ethylenically unsaturated monomer or monomer blend of which at least 5% is ionic. When, as is preferred, the aqueous liquid used for bonding the particles is water it is necessary for the particles to be sufficiently sticky, when swollen by water, to form a comminutable gel or sticky aggregates. However when, as is often preferred, they are used for absorbing water from a mass of inorganic particles to make a crumbly mixture (e.g., as in EP 195550 or GB 2,200,133) they should not be so sticky as to bond the inorganic particles to one another. Thus the monomer blend (including the cross linking agent) should be such that if the particles are relatively coarse (e.g., above 30 μm) the individual particles do not form a film when wetted with water and stick to one another only weakly. However when the particles are very small (for instance below 10 μm) the same monomer blend may result in the formation of a product that does tend to form a film, due to the small particle size and stabilisers and other additives that may be associated.

When the aggregates are used for absorbing water from a sticky particulate mass, as in EP 19550 or GB 2,200,133, the aggregates have the handling and non-dusting properties of coarse particles of the same size but the aggregates then disintegrate in the wet sticky mass and behave within the mass as fines, as a result of which improved characteristics of absorption of water from the mass are obtained.

Preferably however the polymeric material is water soluble, in which event the particles initially absorb water from the water-containing medium and then dissolve in the water of the water-containing medium.

The molecular weight of the soluble polymer will normally be selected so that the polymer has the desired peformance properties, and conveniently so that it also serves as an aggregate binder. Normally the molecular weight is above 1 million. The intrinsic viscosity is generally above 4 dl/g. When the polymer is cationic, values of up to 12 or 15 dl/g are usually adequate but when the polymer is anionic or non-ionic values of up to 25 or 30 or higher may be used.

The aggregates can be formed solely from the polymer particles and binder but it is frequently desirable to include a secondary particulate material in the mix that is to be agglomerated. This material can modify the performance of the aggregates and can facilitate the production of aggregates of any desired size by facilitating the comminution of the aggregates to the desired particle size, either while they are sticky or, preferably, after drying.

Preferably the aggregates include a secondary material that is generally particulate (often below 200 μm or 150 μm in size) and that is a disintegrating aid for promoting disintegration of the aggregates. This disintegrating aid can be a water insoluble particulate material that will prevent the polymer particles bonding too strongly to each other and so will promote disintegration. Examples include coal, coke, fine metals, limestone, dolomite and clays, provided that the clay does not have a structure such that the polymer penetrates firmly into the clay. A particularly preferred insoluble disintegrating aid is very small particle size (e.g., below 10 μm and usually below 1 μm) material such as fumed silica, that is coated on to the polymer particles. This may be included in the aqueous liquid to provide a coating on the polymer particles. This coating prevents or reduces gel blocking and so promotes disintegration.

Generally however the disintegrating aid is a material that is generally monomeric and that is generally highly water soluble in the sense that, when the aggregate is contacted with water, the disintegrating aid will dissolve faster than the polymer particles and will tend to promote disintegration of the aggregates. Particulate secondary material may have a size similar to the polymer particles or may be smaller or larger than the particles.

The combination of the polymer, the disintegrating aid or other second material, and the aggregate binder if present) will be chosen such that the aggregates have disintegration properties that are suitable for their intended use. For example, if the disintegration is intended to occur as a result of mixing the aggregates with water insoluble particulate material in the presence of a relatively low amount of water, disintegration may be due primarily to physical abrasion. However when the water-containing medium is bulk water, the combination of disintegrating aid and binder, if present, should be such that the aggregates will disintegrate spontaneously upon contact with water, optionally accompanied by stirring.

The secondary material that is to serve as a disintegrating aid may be merely an inert material that is to promote disintegration or it may be a material that is to serve a useful purpose with the polymer fines.

One product according to the invention is a powdered binder for pelletising water insoluble particulate material. When the particulate material that is to be pelletised is a metal ore, it is already well known to include various water soluble, monomeric, pelletising aids with the organic binder. These pelletising aids can serve as disintegration aids for the agglomerates of the invention. Suitable materials for this purpose are described in EP 225171 and 288150. Inorganic salts such as sodium carbonate are the materials most widely used as pelletising aids and so are preferred for use in the invention.

It is particularly preferred, when bonding pellets of mineral ores, for the aggregates to comprise water soluble polymer, pelletising aid such as sodium carbonate and, if desired, aggregate binder. Typical amounts are 5 to 90% by weight of the water soluble polymer, 95 to 10% by weight of the pelletising aid and 0 to 10% by weight of the aggregate binder. It is particularly convenient for the aggregate to contain substantially all the pelletising aid that is required for the pelletisation and so preferred proportions are 10 to 70% polymer, 90 to 30% pelletising aid and 0 to 10% aggregate binder.

Particles of cross-linked polymer can be incorporated into the aggregates. The cross-linked polymer may be any of the materials proposed in EP 225171, in similar amounts and for a similar purpose.

Particulate materials that it is preferred to pelletise by using the described aggregates include iron ores, titanium bearing ores, other metal ores, other inorganic materials such as limestone, and organic materials such as sewage sludge, peat and coal. The particle size of the material that is to be pelletised can be in the conventional range for such materials.

The pellets are preferably made by agitation, e.g., tumbling or rolling techniques but can be made by compression techniques, in known manner. The pellets are often dried by baking, after manufacture and before use.

Ore pellets can have conventional size for ore pellets. Pellets for other purposes can range from a relatively small size, e.g., 1 mm, up to relatively large pellets that can be described as briquettes, for instance 50 mm or larger. An advantage of the invention is that it is easier to make them of substantially uniform size and free of fines.

Another product according to the invention is for the formation of an aqueous solution containing inorganic coagulant and a water soluble polymeric flocculant by dissolving a single powder product into the water. For this purpose the disintegrating aid should be the inorganic coagulant, typically a polyvalent metal salt such as aluminium sulphate. Normally this is present in a large excess relative to the flocculant and so a suitable product is formed from 5 to 30% water soluble polymeric flocculant fines and 95 to 70% by weight inorganic polyvalent metal salt coagulant. The polymeric flocculant is a high molecular weight (e.g., IV above 4 dl/g) ionic polymer. It may be anionic but is often cationic, for instance a polymer of dialkylaminoalkyl (meth) -acrylate or -acrylamide (as acid addition or quaternary salt) with, optionally, acrylamide.

Another product according to the invention is formed of 50 to 90% water soluble polymeric flocculant or viscosifier with 50 to 10% of a more soluble compound that may be organic or inorganic and which serves primarily as a diluent that facilitates disintegration of the agglomerates upon addition to water. Typical materials are ammonium sulphate and sucrose. The viscosifier can be non-ionic or ionic of molecular weight above 100,000, and often IV above 1 dl/g and generally above 4 dl/g. The flocculant can be anionic or cationic and can be any suitable flocculant, for instance as described above.

In EP 202780 a flocculation processe is described using polymeric flocculant that at the time of addition to the suspension to be flocculated is in the form of particles below 10 μm, and in which the polymer is added in a floc stabilising amount and the flocculated solids are subjected to shear in the presence of the aqueous medium substantially without increasing the amount of suspended solids in the aqueous medium. The methods that are preferred in EP 202780 for providing the particles are emulsion or reverse phase polymerisation but now we can use agglomerates above 10 μm in size of polymer fines of below 10 μm, the polymers typically being the same as in EP 202780. Preferably the polymers are cationic and have an ionic regain (as explained in EP 202780) of at least 15% and up to 70%, although they can be anionic. Preferably they are slightly cross linked or branched, as described in EP 202780. However they can be wholly soluble and of low ionic regain. Secondary material included in aggregates for this purpose can be a coagulant but is generally a water soluble diluent typically in an amount of 10 to 50% by weight, as described above (e.g., ammonium sulphate or sucrose).

When the disintegration aid is a coating of very fine particulate material such as fumed silica, the amount of disintegration aid may be lower than the preferred 10% minimum, for instance it may be down to about 2% or less, e.g., 0.5%. Such coatings, and/or surface cross linking, are particularly useful when the polymer is a viscosifier or flocculant.

A particularly preferred use of the aggregates is in a process in which a wet particulate sticky mass is converted to a crumbly or flowable solid by mixing into the mass water absorbent polymer particles that preferably have a dry size at least 90% below 50 μm but which are introduced into the mass in the form of internally bonded friable aggregates of above 50 μm in size.

The wet particulate sticky mass may be organic, for instance food waste or sewage but is generally inorganic. Preferably it is coal fines filter cake. Reference should be made to GB 2,200,133 and GB 2,200,440 and to the description that is given below for details of preferred coal fines filter cakes and other inorganic particulate masses, suitable methods of mixing and suitable pre-treatments for the particulate masses. The crumbly or flowable solid that is obtained using these aggregates can be converted into pellets by conventional moulding techniques. When the particulate material is coal fines, for instance when the mass is a coal fines filter cake, the crumbly product can be used as an industrial fuel either in its crumbly form alone or blended with small coal or may be pelletised with or without small coal. Instead of feeding the crumbly solid or pellets (with or without small coal) into a combustion chamber the crumbly solid alone can be dried in a rotary kiln drier or other suitable thermal drier so as to provide a very dry powdered material that can be subsequently pelletised if desired.

Although the use of aggregates is a particularly convenient way of putting the crumbly filter cake into a form such that it can be thermally dried by itself or with only very small additions of small coal, it should be noted that it is also possible, generally less satisfactorily, to achieve this effect by using, for instance, cross linked copolymers of sodium acrylate and acrylamide having a particle size above 125 μm.

It is standard practice to pelletise crumbly, substantially dry, particulate material by moulding, that is to say by subjecting it to compression so as to force the particles into intimate contact such that they adhere to one another. Although various liquid binders can be incorporated, it is desirable to achieve pelletisation without added binder and this is usually possible provided adequate compression is applied during the moulding stage. However a problem that can arise is that strength may decrease during storage, probably due to exposure to weather, especially humidity and rain. This can be a problem when the dry mass that is pelletised by compression is a crumbly mass that has been made from a wet mass of inorganic particles by the addition of the aggregates described above or other dry particulate absorbent material.

We have now surprisingly found that the pellets have improved resistance to weathering when the absorbent material is introduced as a dispersion in water-immiscible liquid.

According to a second aspect of the invention inorganic pellets are made from a sticky wet mass of inorganic particles by a method comrising converting the sticky mass to a crumbly solid by mixing into the mass a dispersion in water-immiscible liquid of water-absorbent polymeric particles below 50 μm in size and having a gel capacity of at least 25 grams deionised water per gram polymer dry weight and then moulding the crumbly solid into pellets. The moulding compresses the crumbly mass sufficient to pack the inorganic particles together sufficiently tightly that they form an adherent structure. The pellets may have a range of shapes and sizes and may be sufficiently large that they can be termed biquettes.

Conventional compression pelletising apparatus can be used. One suitable method is a roll type briquetting machine which can easily be operated at conventional moderate biquetting pressures, for instance 2 to 10 tons per centimeter roll width. Other pelletising apparatus for moulding the crumbly mass under pressure includes roll type compactors, screw type extruders and ring extruders, for instance of the type sold under the trade name "California Pellet Mill". It is particularly preferred to form the pellets using an extruder type briquetter, such as the California Pellet Mill.

When the particulate material is coal filter cake, pelleting can be conducted without compression but by an agitation technique such as by a balling drum or disc-type pelletiser.

It should be noted that performance depends in part upon the temperature within the die. When the moisture content is relatively low more work has to be applied and the die will naturally become relatively warm (e.g., above 40° C., for instance 50°-70° C.), and this is desirable. If the moisture content is rather high, it may be desirable to heat the die artificially in order to improve pellet quality.

Additional organic or inorganic materials may be included in the mass that is to be pelletised in order to strengthen it or for other purposes. For instance lime can be included in coal pellets to give both bonding and desulphurisation during burning. Preferably the absorbent polymeric particles are the only organic polymeric material that is included in the mass and often the mass consists solely of inorganic particulate material and the absorbent polymer. The invention is of particular value when the inorganic material consists of coal fines, especially when the starting material is sticky coal fines filter cake, but is also of value for other inorganic particulate materials such as sand, china clay, crushed mineral, phosphate slime, various other ores, and pigments. The particulate mass may be a toxic or semi-liquid industrial waste or an economically important mass such as carbon black or metallurgical suspensions such as red mud or copper concentrates. The particulate material can be hydrophilic or hydrophobic. When the particulate material is coal fines, it can be the sticky mass that results from vacuum filtration by a disc, drum or other vacuum filter of a slurry or froth flotation concentrate of coal fines, typically having a particle size below 0.5 mm. Often the particle size is mainly in the range 50 to 300 μm, often at least 80% by weight below 100 μm. The ash content of the cake is usually below 30% and often below 15%. The cake can be taken direct from the filter or it can be stored for prolonged periods, e.g., on a wet coal fines dump, before use in the invention.

These particulate masses are all characterised by containing a significant amount of water and by being relatively sticky or fluid. For instance they will normally contain at least 10%, often 20% and usually at least 25% water. Masses such as coal fines filter cakes can contain up to 35, 40 or even 50% water and some of the masses can contain substantially more. Because of their stickiness and water content it is inpracticable to try to feed them to pelletising machinery in that form and instead they must be converted to a much more crumbly or friable texture before they can be pelletised.

It is necessary to ensure uniform mixing of the polymer particles into the sticky mass. The mixing generally comprises some degree of back mixing and, in particular, plug mixing should be avoided since it will result in parts of the sticky mass remaining sticky, due to inadequate contact with polymer particles. The mixing can be achieved by tumbling the mass but preferably it is by means of a rotating mixing blade or other mixer that provides adequate shear. Preferably the mixing is by a Simon or other double scroll mixer or, preferably a plough share mixer, for instance a Lodige or Morton mixer. A plough share mixer has a substantially horizontal cylindrical container provided with a coaxial rotating shaft that carries a plurality of mixing shovels each generally having the shape of a plough share and mounted to rotate close to the wall of the cylinder. The peripheral speed and shape of the shovels causes the product to be whirled from the particulate mass in the lower part of the cylinder into the free mixing zone above the mass, so as to obtain high turbulence and both forward and back mixing.

Soluble polymer can be used, in which event it will tend to become sticky during the process, but preferably the polymer is insoluble, but it will, nevertheless, usually still be slightly sticky when wetted with water. When the particles are relatively coarse, e.g., above 20 $\mu$m, the adhesion between individual particles will normally be relatively low but additional stabilisers in the dispersion may tend to promote adhesion and/or to produce a film interconnecting the particles. When the particles are very small, e.g., below 10 $\mu$m, then the adhesion between the particles may be greater and they may tend to adhere to one another. In particular, stabilisers, thickeners and other additives that can be included in the dispersion (as discussed below) will tend to be film forming such that the dispersion itself is film forming.

The polymer may be natural or modified natural polymer such as a starch acrylonitrile graft copolymer or other modified starch, but preferably it is a synthetic polymer. It may be formed from a monomer blend such that the polymer, in linear form, is swellable but insoluble, for instance as a result of including hydrophobic monomer in the monomer blend. Such polymers can, for instance, be made by oil-in-water emulsion polymerisation. For instance they may be made at a pH at which they are relatively non-swellable and insoluble and the pH may then be adjusted, for use, to a value at which the particles are swellable and absorbent and that is the pH of the wet particulate mass.

Generally however the polymer is made from water soluble monomer or monomer blend. Suitable monomers are generally monoethylenically unsaturated monomers but cross linking agent is preferably included in order to convert the resultant polymer to water insoluble but water swellable form. The cross linking agent can be reacted into the polymer after polymerisation but preferably is present during polymerisation. Generally it is a di- or other poly- ethylenically unsaturated monomer such as methylene bis acrylamide or any of the other ethylenically unsaturated cross linking agents that are suitable for cross linking absorbent polymer particles. Instead of or in addition to relying on a covalent cross linking agent of this type, cross linking can also be through pendant groups in known manner. For instance it can be by polyvalent metal ions.

When the polymer particles are of cross linked, water swellable but insoluble, synthetic polymer, it is sometimes possible to achieve adequate results using a non-ionic polymer but best results are obtained more reliably using a cationic or anionic polymer. The polymer is made from the appropriate monomer or monomer blend. The monomers are generally acrylic. Preferably 5 to 100%, often 10 to 100% is ionic.

Suitable anionic monomers are ethylenically unsaturated carboxylic or sulphonic monomers such as (meth) acrylic acid, allyl sulphonate or 2-acrylamido methyl propane sulphonic acid. Anionic monomers are generally present as a water soluble salt, usually a sodium salt or other alkali metal or amine or ammonium salt.

Suitable non-ionic monomers are (meth) acrylamide and (meth) acrylic esters.

Suitable cationic monomers are dialkyl amino alkyl (meth) -acrylate or -acrylamide as free base, acid salt or, preferably, quaternary salt and diallyl dimethyl ammonium chloride. Cationic monomers are generally used as a blend with acrylamide. Anionic monomers may be present as homopolymer or as copolymers of anionic monomer with, preferably, acrylamide.

The polymers can be as described in EP 213799, or cationic versions thereof.

In some instances best results are achieved using cationic polymer or blends of cationic polymer with anionic polymer, but it is often preferred to use anionic polymer alone. The preferred anionic polymers are cross linked polymers of 5 to 100 mole % acrylic acid (as free acid or salt) with 0 to 95 mole % acrylamide and optionally 0 to 50 mole % other non-ionic or anionic monomer. The acrylic acid is preferably present wholly or mainly, e.g., at least 70 or 80% by weight, as sodium acrylate. Suitable polymers are copolymers in which the amount of acrylic acid (as free acid or salt) is typically from 20 to 75% by weight, with the balance being acrylamide. It is generally preferred for at least 40% by weight of the monomers for the anionic polymer to be sodium acrylate or other water soluble acrylate, for instance ammonium acrylate. Typical polymers of this general type are cross linked polymers of 40 to 60% by weight sodium acrylate with 60 to 40% by weight acrylamide when used as dispersions in water immiscible liquid.

The degree of swellability and absorption is controlled, in-part, by the extent of cross linking and the amount of cross linking agent is usually below 500 ppm, often below 300 ppm. It is usually at least 10 ppm or 20 ppm and preferably at least 50 ppm. Best results are often achieved at around 100 or 200 ppm. These amounts are the amounts by weight on monomer of methylene bis acrylamide and equivalent amounts of other cross linking agents may be used.

The degree of cross linking, and the polymer type, should be such that the gel capacity of the polymer (grams deionised water absorbed per gram polymer) is at least 25, generally at least 100 and preferably at least 200 typically up to 500 or even 700 or higher.

In some instances it is desirable for the polymer particles to have a surface layer that is less swellable than the inner parts of the particles. The desired reduced swellability of the surface layer is preferably obtained by cross linking the surface layer. This reduces the content of linear polymer at any position where it might cause stickiness and has the advantage of promoting uptake of water and of preventing aggregation of the polymer particles. The desired cross linking can be achieved by methods such as those described in U.S. Pat. Nos. 3,114,651, 3,251,814, 4,043,952, 4,093,013 and 4,090,013, JP 1983/42602 and EP 227305. Other ways of treating the surface are by applying a coating of a counter ionic polymer (e.g., poly diallyl dimethyl ammonium chloride or other cationic polymer when the swellable polymer is anionic) or by applying sodium aluminate or other aluminate.

The particles in the dispersion in water-immiscible liquid preferably have at least 90% by weight below about 20 μm or 30 μm, and most preferably below 10 μm. Fastest results are generally achieved with at least 90%, preferably 99%, by weight being below 3 μm, e.g., in the range 0.03 to 2 μm. Often however adequate results are obtained in a cost effective manner, albeit more slowly, if the particle are 90% between 5 and 50 μm, e.g., about 5 to 30 μm.

The water-immiscible liquid may be any organic liquid in which the polymer particles can be adequately dispersed and that will not interfere with the process and so in practice needs to be substantially water immiscible. It can be, for instance, a vegetable oil but is preferably a hydrocarbon or halogenated hydrocarbon liquid. It may be selected from any of the liquids conventionally used in reverse phase dispersions. For instance it can be kerosene or diesel oil or other mineral oil.

The dispersion can be formed at the point of use, with the polymer particles being dispersed into the water-immiscible liquid and the mixture then being applied substantially immediately to the wet particulate mass. Preferably however the dispersion is preformed, in which event it needs to be substantially stable against settlement.

One form of dispersion is a suspension obtained by dispersing preformed dry polymer particles into water-immiscible liquid in the presence of a dispersion stabiliser. The preformed dry polymer particles can be reverse phase microbeads but preferably they are fines separated from polymer gel, e.g., obtained during the comminution of bulk or bead gel or separated from beads obtained by reverse phase polymerisation.

The amount of stabiliser is generally from 1 to 15%, often 3 to 10%, by weight based on the dry weight of polymer. Conventional stabilisers for oil based dispersions may be used, e.g., Bentone clays but preferably the dispersion is stabilised by stirring into it an aqueous emulsion of an oil soluble or oil swellable polymeric thickener, generally a thickener that is insoluble and non-swellable in water. Suitable thickeners are described in EP-A-0161926, for instance in Example 7 and at page 11 line 22 to page 12 line 10.

Instead of using polymer fines, typically having a size of 10 to 30 or 10 to 40 μm, the dispersion can be a reverse phase dispersion made by reverse phase polymerisation of aqueous monomer or monomer blend in water-immiscible liquid. See for instance U.S. Pat. No. 4,059,552. The reverse phase polymerisation is preferably conducted as a reverse phase suspension polymerisation. Formation of an initial dispersion of monomer particles can be facilitated by the incorporation of a small amount of water-in-oil emulsifying agent. Often amphipathic stabiliser is included, in known manner, especially when the dispersion is subsequently azeotroped. Depending upon the degree of agitation when forming the initial dispersion of aqueous monomer in the non-aqueous liquid, and depending upon the amount and type of stabiliser and emulsifier, if present, the dry particle size of the final dispersion can be controlled and typically has a maximum size of 1 μm or up to 2 or 3 μm or 10 μm at the most. The product of the reverse phase polymerisation can be described as an emulsion. It may be dried, e.g., by azeotroping to reduce the water content, typically to below 15% by weight of the polymer. The product is then a substantially dry dispersion.

The amount of amphipathic stabiliser (if present) is generally in the range 0.2 or 0.5 to 10%, and generally below 5%, based on the weight of polymer. The amount of water-in-oil emulsifier is preferably from 0.2 to 3%, based on weight of monomer.

In normal processes in which a reverse phase dispersion in oil of water soluble or swellable polymer is mixed into water, it is conventional to conduct the mixing in the presence of an oil-in-water emulsifier so as to promote distribution of the dispersion and the dispersed polymer into the water. For instance, it is common to add the emulsifier to the polymer dispersion before blending with the water. Because of the apparent need to achieve rapid distribution of the polymer throughout the wet particulate mass, we therefore expected it to be necessary to use such an emulsifier. We have surprisingly found, in the invention, that better results are achieved in the absence of this emulsifier than when the conventional addition is made. This suggests, surprisingly, that it is desirable to retard the rate at which the polymer particles are made available to, and can take up water from, the wet particulate mass.

As described in EP 0277018 the dispersion may have a low polymer content and the polymer particles may contain a substantial amount of water at the time of addition to the wet particulate mass and thus preferred compositions may comprise 30 to 40% by weight polymer 30 to 40% by weight water-immiscible liquid and 25 to 35% by weight water.

It is described in EP 0277018 that the wet particulate mass may be pre-treated with a co-ionic dispersing agent, a counter-ionic coagulant or a co-ionic, counter-ionic or non-ionic flocculant. This may be done but generally it is unnecessary to do this and usually the filter cake or other wet mass is not treated with any of these. Thus preferably the cake is taken off the filters and the only addition to it is of the dispersion and, possibly, other additives such as lime or other binders for the pellets.

The amount of polymer that is applied is generally at least 0.005% and is preferably at least 0.05%. It is usually below 5%, preferably below 2% and most preferably is around 0.2 to 1%. These amounts are of dry polymer based on dry particles by weight.

The following are some examples. The coal filter cakes used in these examples have a maximum particle size below 0.5 mm and contain generally 20 to 30% water and 10 to 15% ash. In the examples values are named as the "shear dissociation time" and the "dissociation time".

The "dissociation time" is recorded by putting 600 g of the coal filter cake in a Hobart mixer bowl, adding the water absorbent polymer, and stirring at speed 2 until the product became sufficiently friable that aggregates start being thrown out of the bowl. The time take for this stage to be reached is the dissociation time and should be as low as possible, for instance below 18 seconds.

After stirring for a further 2 minutes at speed 1, the resultant mix is left for 30 minutes in a sealed bag. 100 grams of the mix is put into a cylinder 65 mm in diameter and pressed into this cylinder to a disc under a cake-forming pressure of 0.38 kg/cm² (5.5 psi) to give a cake. The cake is placed on a rectangular plate so that the entire cake is within the profile of the plate, but a substantially semicircular portion is cut away from one side of the plate so that about one third of the cake is unsupported. A solid plate is lowered at 12 mm/sec on to the top of the cake by a piston and is pressed down on to it with a pressure of 5 psi (0.35 kg/cm$^2$). The time is measured between the plate touching the top of the cake and the cake shattering over the cut away part of the test plate. This is the shear dissociation time (SDT 5). If the cake shatters immediately upon contact with the lowering plate, the shear dissociation time is recorded as zero. Again, low values are preferred. The test can be repeated at higher cake-forming pressures of 20 and 50 psi to give SDT 20 and SDT 50 values.

SDT 5 needs to be below 30 seconds for generally satisfactory results and, in particular, if SDT 5 is below about 20 seconds, preferably below about 10 seconds and most preferably below about 7 seconds (especially substantially zero) and if the dissociation time is satisfactory, then the polymer cake combination is such that, with appropriate mixing, homogeneous blendability with coal smalls can be expected.

For the friable cake to resist caking or clogging during transport, a more friable texture is needed. For this, the SDT test is repeated under a cake-forming pressure of about 20 psi (1.4 kg/cm$^2$), to determine SDT 20, or even at about 50 psi (3.5 kg/cm$^2$) to determine SDT 50. These values also should be below about 20, preferably below about 10, most preferably below about 7 seconds, especially substantially zero.

The stated preferred values for shear dissociation time and dissociation time are such that it will maintain its crumbly texture even under adverse conditions, such as storage. When the crumbly mass is to be pelletised substantially immediately, dissociation and shear dissociation times that are rather higher than these optimum values can usually be tolerated.

The following are some examples.

EXAMPLE 1

Fines having a size mainly 10 to 30 μm are separated from comminuted cross linked polyacrylic acid (75% as sodium salt) gel polymer having a gel capacity well in excess of 25 g water per g polymer. These substantially dry fines are labelled A. Part of them are mixed with sufficient water to make a comminutable gel in which the particles contact one another and adhere to one another, and this gel is then comminuted without exerting substantial pressure to it and is dried on a fluid bed drier, in conventional manner, to a particle size above 125 μm but below 500 μm. This is labelled B.

| Product | Product Dose (1%) | Dissociation Time (sec) | SDT 5 | SDT 20 | SDT 50 |
|---|---|---|---|---|---|
| A | 0.25 | 13.1 | 2.7 | 30+ | 30+ |
|   | 0.5 | 9.9 | 1.3 | 4.7 | 30+ |
|   | 0.75 | 8.3 | 0.7 | 2.9 | 30+ |
|   | 1.0 | 7.9 | 0.9 | 2.9 | 30+ |
| B | 0.25 | 23.2 | 1.5 | 30+ |  |
|   | 0.5 | 14.8 | 0 | 2.0 | 30+ |
|   | 0.75 | 13.1 | 0 | 0 | 3.6 |
|   | 1.0 | 12.5 | 0 | 0 | 2.1 |

This demonstrates that the aggregates give improved results at most dosages but give similar results at low dosages.

EXAMPLE 2

A copolymer of about 60% by weight acrylamide and 40% by weight sodium acrylate and having IV about 10 dl/g was formed by gel polymerisation and it was then dried and comminuted to particles 100% below 200 μm, in conventional manner. 250 g of these particles were mixed with 250 g sodium carbonate particles 100% below 200 μm in the bowl of a Hobart food mixer with various amounts of water and was stirred until the mass had a uniform friability. The amounts of water that were added ranged from 0.15 parts to 1 part per part by weight of polymer and sodium carbonate mixture and it was found that increasing the amount of water gave stronger bonding of the aggregates.

The moist mixture was allowed to dry in air for two days and was then forced through a 2 mm sieve in order to break the brittle but friable product into aggregates which were 90% above 125 μm and 72% below 710 μm.

The aggregated product could then be used as a binder for the formation of pellets of iron ore, substantially as described in EP 225171. Handling of the polymeric component of the binder was much easier than when the process was repeated using the polymer in the form of particles below 200 μm, and the performance properties of the product were better than when the process was repeated using non-aggregated particles of a size similar to the size of the aggregates.

EXAMPLE 3

A relatively high molecular weight cationic flocculant polymer, e.g., a copolymer of acrylamide and dimethylaminoethyl acrylate quaternary salt having intrinsic viscosity above 6 dl/g, is made by gel polymerisation drying and comminution in conventional manner and particles having a size mainly below 100 μm are sieved from the comminuted product. 10 parts by weight of such particles are blended with 90 parts by weight aluminium sulphate particles. The mixture is entrained in air and water, is sprayed into the entrained stream of particles. the resultant aggregates are partly dried while entrained in the air, collected and further dried in a fluidised bed.

Upon contact with flowing water, the aggregates disintegrate and release the flocculant polymer and the coagulant into water to form a solution of coagulant and flocculant.

The flocculation performance of the resultant solution was tested on raw sewage and, as a comparison, the performance was tested of a solution of the dry particulate blend before granulation. The graunular product appeared to require a slightly higher dose to achieve satisfactory floc size, terbidity and clarity but, at its optimum dose, gave better results than the powder product.

When the dry flow properties of the powdered and granular products were compared, there was a dramatic improvement in the performance of the granular product relative to the powdered product. In a standard flow test, it is desirable for the uncompacted and compacted angles to be as low as possible (indicating improved flowability). The granular product had uncompacted and compacted angles of 34° and 38° respectively while the powdered product had angles of 48° and 64° respectively.

EXAMPLE 4

A copolymer of acrylamide and dimethylaminoethyl acrylate quaternary salt having intrinsic viscosity above 6 dl/g and having a moderate ionic regain is made broadly as in Example 1 of EP 202780. The dispersion is dried by azeotroping to give a particle size 90% by weight below 3 μm. The particles are precipitated from the dispersion by adding acetone and are then further dried to remove the acetone. While entrained in air, they are sprayed with water containing fumed silica. This has an extremely small particle size and so forms a coating around the polymer particles. The particles become aggregated, and then partly dried, while entrained in the air and are collected and further dried in a fluidised bed. The resultant aggregates have a size above 150 μm but disintegrate rapidly into the individual particles, and dissolve, upon addition to water.

The resultant solution has flocculation performance properties similar to those of the starting polymer, as explained in EP 202780.

If the powder is added to water, without being aggregated, serious gel blocking occurs and it is inpracticable to obtain a flocculant solution by this technique.

EXAMPLE 5

Sticky coal fines filter cake was taken off the rotary vacuum filters at a colliery and was thoroughly blended with water absorbent polymeric material using a Lodige Plough Share mixer to form a crumbly mass which was fed to a California Pellet Mill having a 19 mm tapered die to produce pellets. The strength of the pellets in kg was measured immediately after 24 hours air curing. The pellets were subjected to a simulated weathering test by immersion in water in both cases. The results of the weathering test are give on a scale of 1 to 7 where 1 represents no effect, 4 represents slight swelling but retaining integrity, 6 represents severe cracking and swelling but retaining integrity, and 7 represents breakdown.

Five absorbent products were tested.

Products A and B were each copolymers of approximately equal amounts of sodium acrylate and acrylamide cross linked with methylene bis acrylamide and made by gel polymerisation followed by comminution and drying. The particles are classified according to size.

Product A used particles mainly in the range 10 to 30 μm dispersed into an equal weight of a hydrocarbon oil that is thickened with a dispersion stabiliser as described at page 18 lines 20 to 35 of EP 0161926A. 1% oil-in-water emulsifier is included.

Product B was the powder having a size mainly above 150 μm.

Product C was a dispersion of 50% oil and 50% substantially dry polymer particles having a size mainly below 3 μm. The dispersion was made by reverse phase polymerisation of 30% acrylamide and 70% acrylic acid mainly in the ammonium form, together with several hundred ppm methylene bis acrylamide.

Product D was made by the same general technique as product C except that the monomers are 10% acrylamide and 90% sodium acrylate.

Product E was a blend of two dispersions of water soluble polymers each having about 50% polymer content and each having been made by reverse phase polymerisation. One of the dispersions was formed from 40% sodium acrylate and 60% acrylamide whilst the other was formed from 50% dimethylaminoethyl acrylate methyl chloride quaternary salt and 50% acrylamide.

The results are shown in the following table. Where the polymer is marked * the die used was a 12.5 mm tapered die instead of the 19 mm die used in the other tests.

| Cake Moisture Content % | Polymer and Amount % | Strength KG No cure | Strength KG 24 hrs cure | Weathering No cure | Weathering 24 hrs cure |
|---|---|---|---|---|---|
| 25.5 | — | 8.9 | 4.7 | 7 | 7 |
| 25.5 | 0.4A | 11.2 | 14.7 | 2 | 2 |
| 25.5 | 0.4B | 7.5 | 24.6 | 6 | 6 |
| 28.0 | 0.4A | 2.3 | 9.1 | 2 | 3 |
| 28.0 | 0.6A | 3.3 | 9.5 | 2 | 3 |
| 25.5 | 0.4C | 9.2 | 22.6 | 2 | 2 |
| 25.5 | 0.4D | 7.0 | 19.2 | 2 | 2 |
| 25.5 | 0.4E | 4.2 | 22.1 | 2 | 2 |
| 25.0 | 0.4A* | 1.9 | 7.1 | 2 | 1 |
| 25.0 | 0.4D* | 2.1 | 4.6 | 3 | 3 |
| 25.0 | 0.4B* | 1.3 | 3.3 | 7 | 6 |
| 25.0 | 0.4C* | 1.3 | 3.0 | 2 | 3 |

Although product B gave pellets having good appearance and good strength, they showed signs of cracking and had very poor weathering characteristics even after allowing for 24 hours curing. Products A, C, D and E, at similar dosage, all gave products of improved weathering characteristics and satisfactory strength properties. It was possible to make pellets having a shiny and good surface.

We claim:

1. A particulate polymeric product comprising particles of a water soluble polymeric viscosifier or flocculant wherein the particles have a size of below 10 μm and are present in the form of friable aggregates of which at least 90% have a size above 50 μm and said aggregates having been made by bonding substantially dry polymer particles with an aqueous liquid and drying the aggregates and said aggregates being friable in that they can be broken down to the individual polymer particles by mixing with an aqueous medium that is to be thickened or flocculated, and wherein the soluble polymer particles are cross linked or branched and were made by polymerization of water soluble ethylenically unsaturated monomer or monomer blend.

2. A product according to claim 1 in which the water soluble polymer is a cationic polymer having intrinsic viscosity above 4 dl/g, a particle size below 10 μm and an ionic regain of 15 to 70%.

3. A product according to claim 2, in which the particles are cross linked.

4. A product according to claim 2 in which the polymer particles were formed from water soluble ethylenically unsaturated monomer or monomer blend by gel or reverse phase polymerisation.

5. A product according to claim 3 in which the polymer particles are formed from 0 to 90% by weight acrylamide and 10 to 100% by weight anionic or cationic monomer.

6. A product according to claim 3 in which the polymer particles were formed from a water soluble monomer or monomer blend which comprises ethylenically unsaturated carboxylic or sulphonic monomer as free acid or water soluble salt.

7. A product according to claim 3 in which the polymer is made from monomer comprising anionic monomer selected from acrylic acid, 2-acrylamido methyl propane sulphonic acid and allyl sulphonic acid.

8. A product according to claim 2 in which the polymer is made from monomer which comprises a cationic monomer selected from dialkylaminoalkyl (meth) -acrylate or -acrylamide and quaternary ammonium salt thereof.

9. A product according to claim 2 in which the aggregates also comprise particles of a disintegrating aid for promoting disintegration of the aggregates upon mixing with the aqueous medium.

10. A product according to claim 2 in which the aggregates are formed of about 50 to 98% by weight water soluble polymeric material, about 2 to 50% by weight disintegration aid and 0 to 10% by weight water soluble aggregate binder.

11. A particulate polymeric product comprising particles of a water soluble polymeric flocculant wherein the particles have a size of below 10 μm and are present in the form of friable aggregates of which at least 90% have a size above 50 μm and said aggregates having been made by bonding substantially dry polymer particles with an aqueous liquid and drying the aggregates and said aggregates being friable in that they can be broken down to the individual polymer particles by mixing with an aqueous medium that is to be flocculated, and wherein the soluble polymer particles are cross linked or branched and were made by polymerization of water soluble ethylenically unsaturated monomer or monomer blend by gel or reverse phase polymerization.

12. A product according to claim 11 in which the water soluble polymer is a cationic polymer having an intrinsic viscosity of above 4 dl/g and up to 15 dl/g, a particle size below 10 μm and an ionic regain 15 to 70%.

* * * * *